United States Patent [19]

Sanders et al.

[11] 4,247,832
[45] Jan. 27, 1981

[54] ISOTROPIC NONPLANAR RING LASER

[75] Inventors: Virgil E. Sanders, Newbury Park, Calif.; Dana Z. Anderson, Tucson, Ariz.

[73] Assignee: Litton Systems, Inc., Beverly Hills, Calif.

[21] Appl. No.: 973,096

[22] Filed: Dec. 26, 1978

[51] Int. Cl.³ .............................................. H01S 3/101
[52] U.S. Cl. .......................... 331/94.5 C; 331/94.5 D; 356/350
[58] Field of Search .................... 331/94.5 C, 94.5 D; 356/350

[56] References Cited

PUBLICATIONS

Molchanov et al., "Matrix Method for the Calculation of the Polarization Eigenstates of Anisotropic Optical Resonators", Soviet Journal of Quantum Electronics, vol. 1, No. 4, p. 315, 1972.
Chernen'Kii; "Anisotropic Optical Traveling-Wave Resonator"; Soviet Journal of Quantum Electronics; vol. 1, No. 5, pp. 472-476, Mar.-Apr., 72.
Sanders et al., "Dual-Polarized Ring Lasers"; IEEE Journal of Quantum Electronics; vol Qe-13, No. 9, Sep., 1977.
Raterink et al.; "Development of a Ring Laser for Polarimetric Measurements"; Applied Optics; vol. 6, No. 5, May, 1967.

Primary Examiner—William L. Sikes
Assistant Examiner—Léon Scott, Jr.
Attorney, Agent, or Firm—Roy L. Brown; Harold E. Gillmann; Walter R. Thiel

[57] ABSTRACT

A nonplanar ring laser for use as a laser gyro includes an even number of at least six reflecting surfaces which are preferably all made from the same coating batch or coating run so that they have substantially the same anisotropy characteristics. The mirrors are divided into pairs of mirrors, and the mirrors in at least each pair must match in their anisotropic characteristics. Note that the matched mirrors need only be in the laser path but not necessarily adjacent.

The nonplanar geometric arrangement of the reflecting surfaces is such that the reflecting plane of incidence of each mirror is at substantially a right angle to the reflecting plane of incidence of at least one of the adjacent mirrors in the laser path. Note that the reflecting plane of incidence of each mirror may optionally be at right angles to the reflecting planes of incidence of both its adjacent mirrors in the laser path.

The angles of incidence of the mirrors in each matched pair must be substantially the same.

Using this geometry, and at least the mirrors in each matched pair being from a single coating batch having the same anisotropy characteristics, the phase and attenuation shifts which are introduced by imperfect coatings are cancelled in the ring laser cavity. Due to the substantial reduction in phase and attenuation anistropy this ring laser configuration reduces coupling between the two modes travelling in the same direction when used in a multioscillator laser gyro, and therefore improves gyro performance.

6 Claims, 15 Drawing Figures

4,247,832

ISOTROPIC NONPLANAR RING LASER

FIELD OF THE INVENTION

This invention relates to ring lasers.

BACKGROUND OF THE INVENTION

This class of device is described, for example, in a text entitled "Laser Applications" edited by Monte Ross, Academic Press, Inc., New York, N.Y., 1971 in which pages 134 to 200 relating to "The Laser Gyro" are particularly to be noted.

It is well known that two counterrotating laser beams may be established in a ring type laser. When the ring laser is rotated about a particular axis passing centrally through the ring laser, the frequency of the oscillations are shifted, with the frequency of the beam travelling in the direction of rotation exhibiting a decrease, and the frequency of the beam travelling in the direction opposite to the rotation exhibiting an increase. The amount of rotation may be determined by detecting the beat frequencies between the counterrotating beams. Using a set of three laser gyros, having mutually perpendicular sensing axes, this phenomenon may be employed in inertial guidance systems to determine the rotation and the resultant orientation of an airplane or the like.

In ring lasers of the type mentioned above, the reflecting surfaces are of dielectric materials and are built up of from 15 to 30 layers, in the usual cases. They are intended to provide proper reflection characteristics for both the P mode of polarization (P having the electric vector parallel to the plane of incidence) and for the S polarized components (where the electric vector is orthogonal to the P vector). Unfortunately it is almost impossible to produce reflecting surfaces or mirrors having little or no phase anisotropy at the desired angle of incidence. Further, temperature and other changes affect the anisotropy. More specifically, manufacturers of such dielectric mirrors are unable consistently to produce dielectric mirrors having phase and attenuation isotropic characteristics for P and S polarization at the desired angles of incidence, such as 30° for a three mirror ring laser and 45° for a four mirror ring laser.

When ring lasers are constructed using these imperfect or anisotropic mirrors, there is strong coupling between the modes, and it is difficult to achieve multioscillator operation.

SUMMARY OF THE INVENTION

In accordance with the present invention, it was initially determined that mirror anisotropy was a significant cause of mode coupling in multioscillator four mode ring lasers. To avoid the mode coupling, a mirror geometry employing at least three matched pairs of mirrors in a particular nonplanar geometry is employed. More specifically, an even number of mirrors, not less than six, have their anisotropy matched in pairs. The matched pairs need not be adjacent, but they may be arbitrarily positioned in the laser path. They must, however, conform to the geometric constraints recited herein.

The incident and reflecting rays define a plane of incidence for each mirror. It is required that the plane of incidence of each mirror be orthogonal to the plane of incidence of at least one adjacent mirror in the laser path. Note that the two adjacent mirrors for this requirement need not have matched anisotropies.

The third requirement on the mirrors is that each mirror of each pair of matched mirrors must have the same angle of incidence as the other mirror in that pair.

An important advantage of the present invention lies in the fact that, with this geometry, when mirrors having substantially the same anisotropy characteristics are employed in pairs, the relative attenuation and phase shift between the S and P modes of polarization cancels. Therefore the coupling between modes is substantially eliminated, and improved multioscillator laser gyro operation can be achieved.

In accordance with another feature of the invention, the ring laser may be constructed out of a block of material of the general shape of a rectangular parallelopiped. Typically holes are bored through the material from mirror to mirror parallel to the desired laser path in the block, and particular edges of the block of material are then chamfered or cut away at an angle to provide mounting areas for the reflecting surfaces, or mirrors. In addition, suitable anode and cathode structures (not shown) as well as multimode producing elements (not shown) are added to produce a working laser gyro.

It is therefore an object of this invention substantially to eliminate the effects of anisotropic reflection in a ring laser.

It is another object of this invention to create an improved ring laser.

It is a more specific object of this invention to create an improved nonplanar ring laser having anisotropic effects canceled.

Other objects, features and advantages of the invention will become apparent from a consideration of the following detailed description and from the drawings.

DETAILED DESCRIPTION OF THE INVENTION

Figure 1:
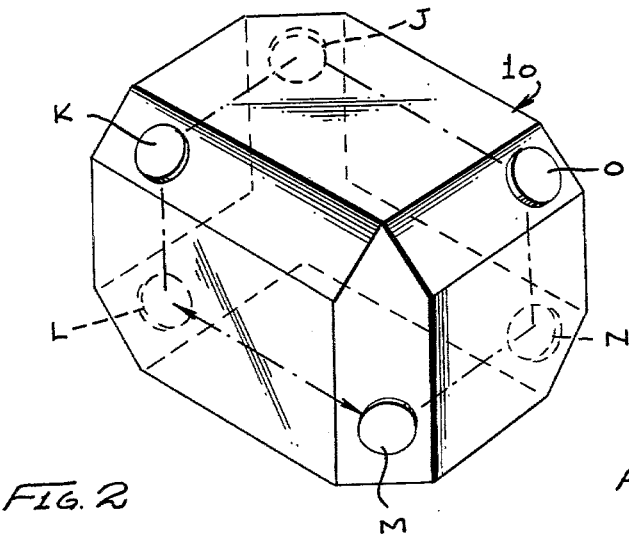
FIG. 1 is an oblique view of a typical six mirror embodiment of the invention.
Figure 2:
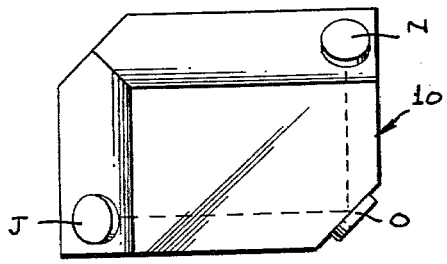
FIGS. 2 through 7 are views of the faces of an orthogonal layout of the embodiment of FIG. 1.
Figure 3:
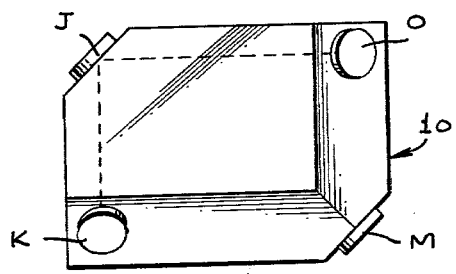
Figure 4:
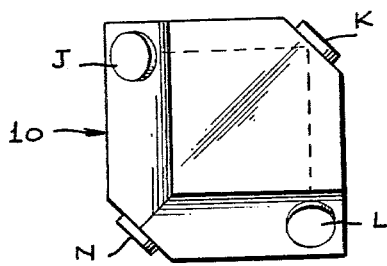
Figure 5:
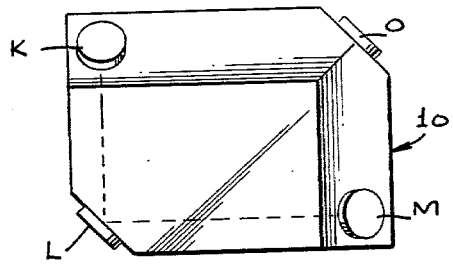
Figure 6:
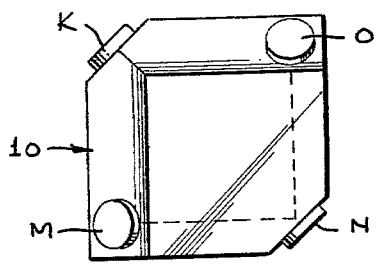
Figure 7:
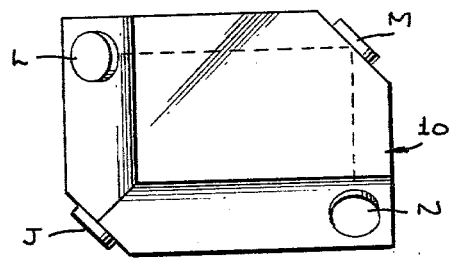
Figure 8:
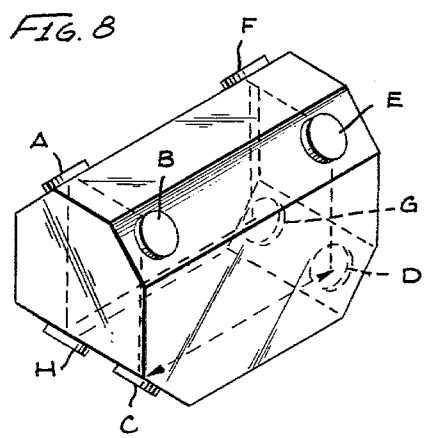
FIG. 8 is an oblique view of a typical eight mirror embodiment of the invention.
Figure 9:
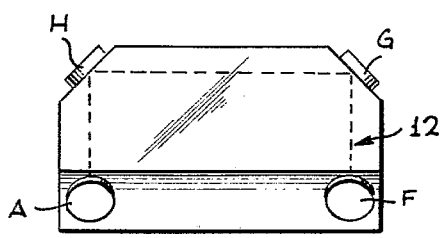
FIGS. 9 through 14 are views of the faces of an orthogonal layout of the embodiment of FIG. 8.
Figure 10:
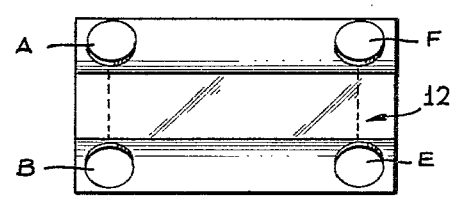
Figure 11:
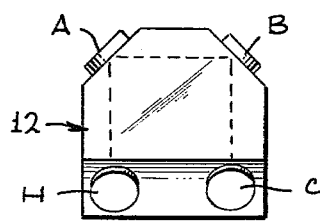
Figure 12:
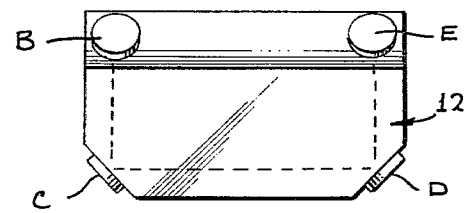
Figure 13:
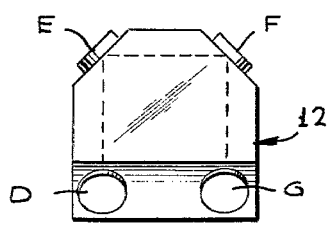
Figure 14:
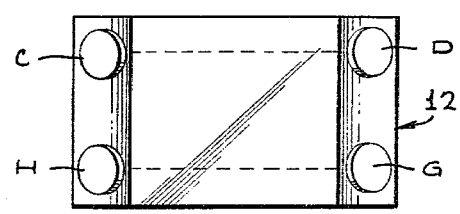

A block of material 10, 12 is provided of the type of low thermal expansion type of material normally employed in the manufacture of laser gyros. This body member 10, 12 may, for example, be made of quartz, or of so-called "U.L.E." titanium silicate available from Corning, or of "Cervet" available from Owens, Ill.

This invention pertains to a unique geometric mirror arrangement which results in an isotropic (i.e., with respect to linear phase birefringence and loss anisotropy) ring laser gyro cavity. FIGS. 1-8 show a six mirrored out of plane ring laser using the arrangement of this invention. FIGS. 9-14 show an eight mirrored out of plane ring laser using the arrangement of this invention. The anisotropy of the mirrors must be matched in identical pairs of coatings. The geometric arrangement is such that both the phase and loss (Q) anisotropy contribution to the ring laser by each pair of matched mirrors is nulled. The mathematical null result is demonstrated by considering a pair of adjacent matched mirrors. The nulling is accomplished by the planes of incidence of a pair of adjacent, matched mirrors being mutually orthogonal to each other and the angles of incidence for each being equal. A Jones matrix analysis of two identical mirrors geometrically arranged in the manner of this invention demonstrates this null result:

$$C(\delta)R(90°)C(\delta) = xy\, R(90°); \quad (1)$$

where the Jones matrix $$C(\delta) = \begin{pmatrix} xie^{i\frac{\delta}{2}} & 0 \\ 0 & -yie^{-i\delta/2} \end{pmatrix} \quad (2)$$

represents an anisotropic mirror with substantially $\delta$ linear phase birefringence at some angle of incidence and x and y are the P and S reflectance respectively of both mirrors.

$$R(90°) = \begin{pmatrix} 0 & -1 \\ 1 & 0 \end{pmatrix} \quad (3)$$

is the matrix representing a rotation of the plane of incidence through 90 degrees after reflection from the first mirror in the pair. Note that the result from the pair of reflections described in equation (1) has no trace of the $\delta$ birefringence but only the 90 degree rotation.

Note that the anisotropically matched mirrors need not be adjacent. After the above calculation is made assuming a matched pair of adjacent mirrors (which is a convenient mechanization) the mirrors in the entire apparatus may be arbitrarily interchanged without loss of anisotropic cancellation.

Figure 15:
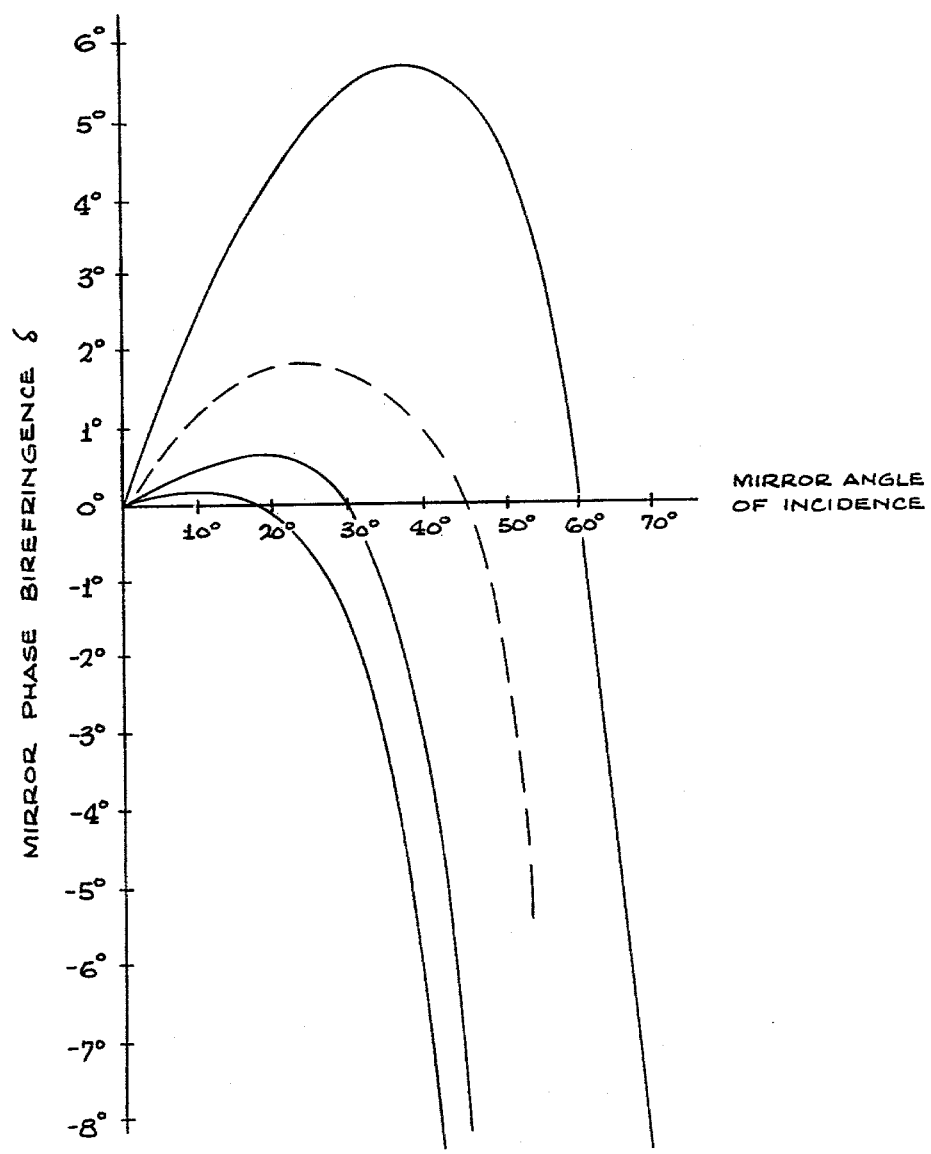
FIG. 15 is a plot mirror phase birefringence vs. mirror angle of incidence.

Virtually all multilayered dielectric mirrors exhibit to some degree both phase and Q anisotropy for reflections at oblique angles of incidence. FIG. 15 is a graph of the mirror reflectance induced phase birefringence as a function of angle of incidence for several mirrors. The curves shown in FIG. 15 represent three separate mirrors. Two matched mirrors would be represented by one single curve in FIG. 15. Thickness of layer and optical index are exceedingly critical parameters in highly reflecting multilayer dielectric stacks with respect to this phase shift-angle of incidence relation (FIG. 15). They are difficult to control and monitor. However, to the benefit of this invention, two such mirrors coated at the same time in close proximity have almost identical phase shift-angle of incidence curves. This feature gives a simple way of obtaining matched pairs of identical mirrors. Using the above mentioned geometric arrangement on an eight mirrored cavity a $10^3$ reduction in anisotropy was obtained from four matched pairs of mirrors.

The basic requirements on the laser path, in accordance with this invention are:

1. There must be an even number of mirrors, no less than six, with the mirrors being arranged pairs of mirrors having substantially the same anisotropy. The matched mirrors are not necessarily adjacent.

2. The plane of incidence of each mirror must be orthogonal to the plane of incidence of at least one adjacent mirror in the laser path. Optionally it may be orthogonal to the planes of incidence of both adjacent mirrors in the laser path. Note that adjacent mirrors may optionally be anisotropically matched.

3. The angle of incidence of the two mirrors in each matched pair must be equal.

To the extent that any one of the three requirements is not met, the anisotropic properties are not cancelled. In some apparatus a small amount of anisotropy can be tolerated, and a small deviation from the three requirements is allowed. In that sense, one may say the three requirements only need be substantially met.

FIGS. 1–8 teach a typical six mirror configuration according to this invention. The six mirror configuration requires three pairs of mirrors with matched anisotropic properties in each pair. The matched pairs of mirrors do not have to be adjacent pairs of mirrors. However, for convenience of explanation choose the matched pair selection J-L, M-N, K-O. With this chose, J and L, M and N, K and O must have its pair-partner with substantially the same anisotropic quantities as itself. In the selected pair grouping J is the same as L, M is the same as N, and K is the same as O.

The planes of incidence of adjacent mirrors are orthogonal. The plane of incidence of mirror J is defined by the rays OJ and JK. The plane of incidence of mirror K is defined by the rays JK and KL. The plane of Incidence of mirror L is defined by the rays KL and LM. The plane of incidence of mirror M is defined by the rays LM and MN. The plane of incidence of mirror J is defined by the rays MN and NO. The plane of incidence of mirror O is defined by the rays NO and OJ. That is, the plane of incidence of mirror J is perpendicular to that of mirrors K and O. The plane of incidence of mirror K is perpendicular to that of mirrors J and L. The plane of incidence of mirror L is perpendicular to that of mirrors K and M. The plane of incidence of mirror M is perpendicular to that of mirrors L and N. The plane of incidence of mirror N is perpendicular to that of mirrors M and O. The plane of incidence of mirror O is perpendicular to that of mirrors N and J. Note that the planes of incidence of the shown six mirrors are parallel and adjacent to the six faces of the rectangular parallelopiped defining the block 10 before any surfaces were beveled. Thus the second requirement is met.

In the FIGS. 1–8, the angles of incidence and reflection are 45 degrees. Hence the third requirement is met. Note that they need not be 45 degrees. It is only necessary that the angles of incidence of each matched pair J-L, M-N, K-O be matched.

An embodiment using 4 pairs of matched mirrors is shown in FIGS. 8–14. The matched pairs of mirrors are arbitrarily chosen as A-D, C-G, E-F, B-H.

The planes of incidence of mirrors A, B, C, D, E, F, G, H are, respectively, defined by the rays HA and AB, AB and BC, BC and CD, CD and DE, DE and EF, EF and FG, FG and GH, and GH and HA. It is then seen that the planes of incidence of the adjacent mirrors B and C, D and E, F and G, and H and A are perpendicular to each other. Thus the second requirement is met. Note in the embodiment of FIG. 8, that the plane of incidence of each mirror is adjacent a lateral face of a rectangular parallelopiped with two mirrors sharing each said lateral face.

All of the shown mirrors in FIGS. 8–14 have angles of incidence and reflection of 45 degrees. But note that they need not be 45 degrees provided the angles of incidence and reflection of the mirrors are the same in each mirror of the chosen matched pairs A-D, C-G, E-F, B-H. Thus the third requirement is met.

The blocks 10 and 12 are shown substantially in a cube with certain edges beveled to support a mirror at the required angle. But note that the shape of the block is not critical, for the mirrors could be inserted into the block through holes (not shown) to be positioned at the desired angles with respect to the laser path.

Further, the laser cavity is not shown. The laser cavity surrounds the laser path and is usually merely a bore within the block. The laser cavity is filled with a laser gain medium such as Helium-Neon gas.

To make the laser lase, portions of the laser path, designated the gain sections, must be stimulated. One means of stimulating the gas is to attach a cathode electrode (not shown) and a pair of anode electrodes (not shown) to the block 10, 12 in positions so that electron and ion flow between the electrodes stimulates the gain medium in the gain sections. For a ring laser gyro, the electrodes must be placed so that electron and ion flow splits and flows in opposite directions through the gain medium to produce two or more sets of radiation waves, part travelling in one direction and part travelling in the other direction along the laser path.

Further, means may be provided for moving one or more of the mirrors to tune the cavity length and to dither the cavity length. Optical means such as half-silvered mirrors and prisms (not shown) may also be used to direct radiation from the ring laser and to deliver it to a radiation sensor (not shown) for further signal processing of the signal to generate a signal which is a measure of angular rate of the ring laser about a particular axis.

It may also be desirable, for other reasons in connection with make on optimum ring laser for gyro operation, to include crystals and/or magnetic fields in the laser path.

The features not shown are either known in the art or are the subject matter of other patent applications.

Although the invention has been described above in two of its embodiments, it is not intended that the invention shall be limited by that description alone, but only in combination with the appended claims.

We claim:

1. In combination:
    at least three selected pairs of resonator mirrors positioned to define a nonplanar ring laser path, each resonator mirror of each said pair of resonator mirrors having matched reflection anisotropies which are substantially the same as the reflection anisotropies of the other resonator mirror in its said pair of resonator mirrors;
    each resonator mirror having its plane of incidence along said laser path substantially orthogonal to the plane of incidence along said laser path of at least one of the two next consecutive resonator mirrors along said laser path;
    the angles of incidence along said laser path being substantially the same for both said resonator mirrors in each of said matched pairs of resonator mirrors.

2. Apparatus as recited in claim 1 in which said substantially matched reflection anisotropies are phase and attenuation anisotropies.

3. Apparatus as recited in claim 1 in which reflectances for P and S polarized waves along said laser path in one said resonator mirror of each of said matched pairs of resonator mirrors are substantially the same as the corresponding reflectances for P and S polarized waves along said laser path in the other said resonator mirror in that said pair of resonator mirrors.

4. Apparatus as recited in claim 1 in which there are six said resonator mirrors geometrically positioned so that the plane of incidence of each said resonator mirror along said laser path is, respectively, adjacent and parallel to a face of a rectangular parallelopiped.

5. Apparatus as recited in claim 1 in which there are eight resonator mirrors geometrically positioned so that the segments of said laser path are each parallel to a face of a rectangular parallelopiped.

6. Apparatus as recited in claim 1 in which said resonator mirrors of each said pair of matched resonator mirrors are consecutively positioned in said laser path, and the relationship between said mirrors in each said pair of matched resonator mirrors is substantially characterized by the equations $$C(\delta)R(90°)C(\delta) = xy\, R(90°);$$

wherein the Jones matrix $$C(\delta) = \begin{pmatrix} xie^{i\delta/2} & 0 \\ 0 & -yie^{-i\delta/2} \end{pmatrix}$$

represents an anisotropic mirror with substantially linear phase birefringence, $\delta$, at some angle of incidence, x and y are the reflectances for P and S polarized waves, respectively, of both resonator mirrors of a particular said matched pair of resonator mirrors, and i is the complex number operator $\sqrt{-1}$; and $$R(90°) = \begin{pmatrix} 0 & -1 \\ 1 & 0 \end{pmatrix}$$

representing a rotation of the plane of incidence along said laser path through 90 degrees after reflection from a first said resonator mirror in each said pair of matched resonator mirrors.